(12) United States Patent
Nakashima et al.

(10) Patent No.: US 8,974,336 B2
(45) Date of Patent: Mar. 10, 2015

(54) POWER TRANSMISSION BELT

(75) Inventors: Eijiro Nakashima, Kobe (JP); Shigeki Okuno, Kobe (JP)

(73) Assignee: Bando Chemical Industries, Ltd., Kobe-Shi, Hyogo (JP)

( * ) Notice: Subject to any disclaimer, the term of this patent is extended or adjusted under 35 U.S.C. 154(b) by 363 days.

(21) Appl. No.: 12/999,993

(22) PCT Filed: Jul. 7, 2009

(86) PCT No.: PCT/JP2009/003157
§ 371 (c)(1),
(2), (4) Date: Dec. 17, 2010

(87) PCT Pub. No.: WO2010/007741
PCT Pub. Date: Jan. 21, 2010

(65) Prior Publication Data
US 2011/0124453 A1 May 26, 2011

(30) Foreign Application Priority Data

Jul. 17, 2008 (JP) ................................. 2008-186365

(51) Int. Cl.
*B32B 25/02* (2006.01)
*B32B 25/08* (2006.01)
*F16G 5/20* (2006.01)
*F16G 5/04* (2006.01)
(Continued)

(52) U.S. Cl.
CPC ... *F16G 5/20* (2013.01); *F16G 1/10* (2013.01)
USPC ........... 474/265; 474/139; 474/260; 474/263; 474/237; 474/238; 428/221; 428/292.1; 428/295.1; 428/297.1

(58) Field of Classification Search
USPC .......... 474/237–239, 260, 263, 265; 428/221, 428/292.1, 295.1, 297.1, 304.4–319.9
See application file for complete search history.

(56) References Cited

U.S. PATENT DOCUMENTS 5,256,228 A * 10/1993 Davis et al. .................... 156/157
5,610,217 A * 3/1997 Yarnell et al. ................. 524/397
(Continued)

FOREIGN PATENT DOCUMENTS

JP 7-269658 A 10/1995
JP 2002-81506 A 3/2002
(Continued)

OTHER PUBLICATIONS

Simpson, R.B., Rubber Pocket Book, 2002, Rapa Technology Limited, p. 3.*
(Continued)

*Primary Examiner* — Arti Singh-Pandey
*Assistant Examiner* — Frank Vineis
(74) *Attorney, Agent, or Firm* — Roberts Mlotkowski Safran & Cole P.C.

(57) ABSTRACT

A power transmission belt (10) includes: a belt body (11) including a part (14) which is in contact with a flat pulley and which is made of a rubber composition containing an ethylene-α-olefin elastomer with an ethylene content of less than or equal to 60% by mass as raw rubber. The rubber composition forming the contact part (14) with the flat pulley has a storage modulus of 20-60 MPa at 25° C. and a storage modulus of 12 MPa or more at 100° C., short fibers are not blended into the rubber composition, and the grain direction of the rubber composition corresponds to a belt lengthwise direction.

2 Claims, 9 Drawing Sheets

(51) Int. Cl.
*F16G 5/06* (2006.01)
*F16G 5/08* (2006.01)
*F16G 1/10* (2006.01)

(56) References Cited

U.S. PATENT DOCUMENTS

| | | | |
|---|---|---|---|
| 7,258,639 B2 * | 8/2007 | Tachibana et al. | 474/237 |
| 2002/0032091 A1 | 3/2002 | Okuno et al. | |
| 2009/0011884 A1 * | 1/2009 | Nakashima et al. | 474/205 |
| 2009/0298632 A1 * | 12/2009 | Shiriike et al. | 474/263 |

FOREIGN PATENT DOCUMENTS

| | | |
|---|---|---|
| JP | 2003-194167 A | 7/2003 |
| JP | 2006-29493 A | 2/2006 |
| JP | 2006-349121 A | 12/2006 |
| JP | 2007255635 A * | 10/2007 |
| WO | WO 2006075600 A1 * | 7/2006 |
| WO | WO 2007102310 A1 * | 9/2007 |

OTHER PUBLICATIONS

Machine Design, Flat Belts, Nov. 15, 2002, MachineDesign.com, p. 1, paragraph 8.*
Hutchinson Pocket Dictionary of Physics, 2005, Helicon Publishing, p. 120.*
Partial Translation of JP 2006-029493—Table 1, Jun. 9, 2014.*
Human Translation of JP 2006-029493A, Sep. 2014.*
International Search Report for PCT/JP2009/003157 mailed Oct. 13, 2009.

* cited by examiner (a) ADHESION LEVEL 1

(b) ADHESION LEVEL 2

(c) ADHESION LEVEL 3

(d) ADHESION LEVEL 4

(a)

(b)

(a)

(b)

(a)

(b)

US 8,974,336 B2

POWER TRANSMISSION BELT

TECHNICAL FIELD

The present invention relates to power transmission belts, and more particularly relates to a power transmission belt used while being wound around a flat pulley.

BACKGROUND ART

A power transmission belt, such as a V-ribbed belt, is generally formed by laminating an adhesion rubber layer having a cord embedded therein and a compression rubber layer provided on the surface of the adhesion rubber layer located near the inner periphery of the belt. In addition to these materials, a backing rubber layer is provided on the surface of the adhesion rubber layer located near the outer periphery of the belt, thereby increasing the power transmission ability during power transmission on the back face of the belt.

PATENT DOCUMENT 1 describes that a monofilament with a flat cross section is embedded in a backing rubber layer of a V-ribbed belt, and further describes that such a structure can prevent rib rubber from being longitudinally split along grooves between V-ribs.

PATENT DOCUMENT 2 describes a structure in which a backing rubber layer of a V-ribbed belt is made of a rubber composition containing an ethylene-α-olefin elastomer with an ethylene content of 40-60% and a Mooney viscosity of 40-60 as raw rubber, and further in which the total amount of addition of reinforcing short fibers to the backing rubber layer is 0-30 parts by weight (pbw) per 100 pbw of rubber. PATENT DOCUMENT 2 further describes that such a structure provides excellent bending fatigue resistance, heat resistance, cold resistance, wear resistance, and adhesion resistance.

CITATION LIST

Patent Document

PATENT DOCUMENT 1: Japanese Patent Publication No. H07-269658
PATENT DOCUMENT 2: Japanese Patent Publication No. 2006-29493

SUMMARY OF THE INVENTION

Technical Problem

When a power transmission belt is run while being wound around a pulley, a contact part of the power transmission belt with the pulley is worn out, thereby generating wear debris. When the pulley around which the power transmission belt is wound is a flat pulley, the generated wear debris tends to accumulate between the belt and the pulley, and thus, tends to be deposited on the belt surface. In particular, when the adhesion resistance of the contact part with the flat pulley is low, this accelerates the deposition of wear debris. Such wear debris deposit forms a step on the belt surface, and this step causes abnormal noise during the run of the belt.

It is an object of the present invention to provide a power transmission belt which is used while being wound around a flat pulley, a contact part of which with the flat pulley has better wear resistance and adhesion resistance, and which reduces abnormal noise during the run of the belt without impairment of the cold resistance and the heat resistance.

Solution to the Problem

A power transmission belt of the present invention includes: a belt body including a part which is in contact with a flat pulley and which is made of a rubber composition containing an ethylene-α-olefin elastomer with an ethylene content of less than or equal to 60% by mass as raw rubber. The rubber composition forming the contact part with the flat pulley has a storage modulus of 20-60 MPa at 25° C. and a storage modulus of 12 MPa or more at 100° C., short fibers are not blended into the rubber composition, and the grain direction of the rubber composition corresponds to a belt lengthwise direction.

In the power transmission belt of the present invention, the contact part with the flat pulley may be a back face of the belt.
In this case, the belt body may be a V-ribbed belt body.
In the power transmission belt of the present invention, the belt body may be a flat belt body, and the contact part with the flat pulley may be a belt inner circumferential surface of the flat belt body which is the belt body.

Advantages of the Invention

According to the present invention, a contact part of a belt body with a flat pulley is made of a rubber composition containing an ethylene-α-olefin elastomer with an ethylene content of less than or equal to 60% by mass as raw rubber, the rubber composition forming the contact part with the flat pulley has a storage modulus of 20-60 MPa at 25° C. and a storage modulus of 12 MPa or more at 100° C., short fibers are not blended into the rubber composition, and the grain direction of the rubber composition corresponds to a belt lengthwise direction. This provides good wear resistance and good adhesion resistance without impairment of the cold resistance and the heat resistance, resulting in a reduction in abnormal noise during the run of the belt.

DESCRIPTION OF EMBODIMENTS

First and second embodiments will be described hereinafter in detail with reference to the drawings.

First Embodiment

Figure 1:
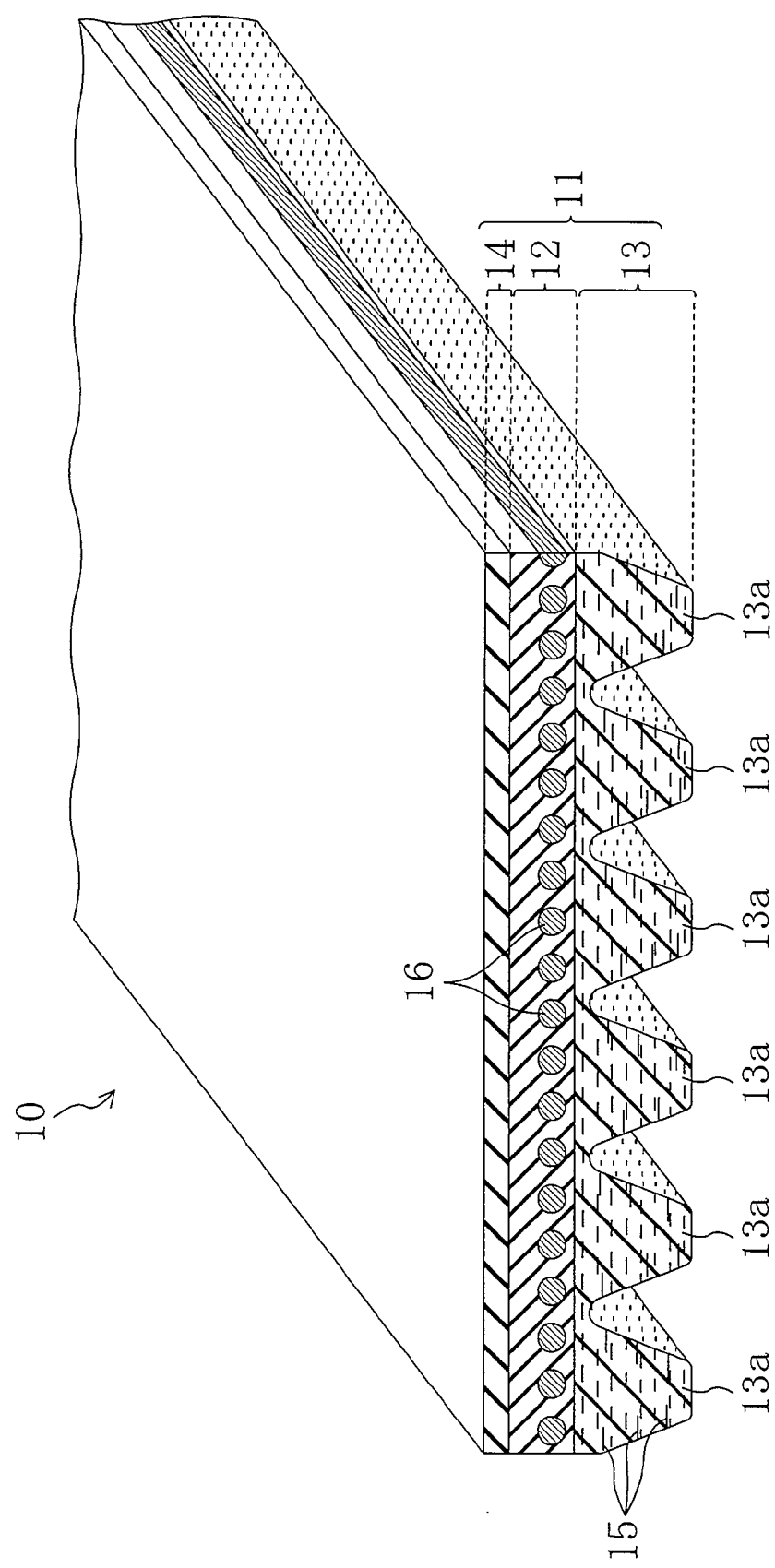
FIG. 1 is a perspective view of a V-ribbed belt.

FIG. 1 illustrates a V-ribbed belt 10 according to a first embodiment. The V-ribbed belt 10 is used for, e.g., an accessory drive belt transmission system placed in an automotive engine compartment. The V-ribbed belt 10 is farmed with, e.g., a length of 700-3000 mm, a width of 10-30 mm, and a thickness of 4.0-5.0 mm.

The V-ribbed belt 10 includes a V-ribbed belt body 11 formed in a triple layered structure including an adhesion rubber layer 12 forming an intermediate part of the belt, a compression rubber layer 13 forming an inner part of the belt, and a backing rubber layer 14 forming an outer part of the belt. Furthermore, the adhesion rubber layer 12 has a cord 16 embedded therein in a spiral with a pitch in the belt widthwise direction.

The adhesion rubber layer 12 is formed in the shape of a strip of long rectangular cross section, and has a thickness of 1.0-2.5 mm, for example. The adhesion rubber layer 12 is made of a rubber composition in which various compounding ingredients are blended into raw rubber. Examples of the raw rubber of the rubber composition forming the adhesion rubber layer 12 include an ethylene-α-olefin elastomer, such as ethylene-propylene rubber (EPR) and ethylene-propylene-diene monomer rubber (EPDM), chloroprene rubber (CR), chlorosulfonated polyethylene rubber (CSM), and hydrogenated acrylonitrile rubber (H-NBR). Out of them, an ethylene-α-olefin elastomer is preferable in terms of its environmental friendliness and performance, such as its wear resistance and crack resistance. Examples of the compounding ingredients include a crosslinker (e.g., sulfur, organic peroxides, etc.), an antioxidant, a processing aid, a plasticizer, a reinforcer, such as carbon black, and a filler. Short fibers may be blended into the adhesion rubber layer 12. However, in terms of the adhesion to the cord, it is preferable that short fibers not be blended. The adhesion rubber layer 12 is made of the rubber composition obtained by blending compounding ingredients into raw rubber, kneading them to form an unvulcanized rubber composition, and crosslinking the unvulcanized rubber composition using a crosslinker by application of heat and pressure.

The compression rubber layer 13 is formed so that a plurality of V-ribs 13a extend inward of the belt. The plurality of V-ribs 13a are each formed into a rib of substantially inverted triangular cross section extending in the belt lengthwise direction, and are arranged in parallel in the belt widthwise direction. Each V-rib 13a is formed, for example, with a height of 2.0-3.0 mm, and a width of 1.0-3.6 mm between its root ends. The number of ribs is 3-6, for example (six in FIG. 1).

The compression rubber layer 13 is made of a rubber composition in which various compounding ingredients are blended into raw rubber. Examples of the raw rubber of the rubber composition forming the compression rubber layer 13 include an ethylene-α-olefin elastomer, such as ethylene-propylene rubber (EPR) and ethylene-propylene-diene monomer rubber (EPDM), chloroprene rubber (CR), chlorosulfonated polyethylene rubber (CSM), and hydrogenated acrylonitrile rubber (H-NBR). Out of them, an ethylene-α-olefin elastomer is preferable in terms of its environmental friendliness and performance, such as its wear resistance and crack resistance. Examples of the compounding ingredients include a crosslinker (e.g., sulfur, organic peroxides, etc.), an antioxidant, a processing aid, a plasticizer, a reinforcer, such as carbon black, a filler, and short fibers 15. The compression rubber layer 13 is made of a rubber composition obtained by blending compounding ingredients into raw rubber, kneading them to form an unvulcanized rubber composition, and crosslinking the unvulcanized rubber composition using a crosslinker by application of heat and pressure.

The short fibers 15 are oriented, e.g., in the belt widthwise direction. Some of the short fibers 15 are exposed at the surfaces of the V-ribs 13a. The short fibers 15 exposed at the surfaces of the V-ribs 13a may protrude beyond the surfaces of the V-ribs 13a. Examples of the short fibers 15 include short aramid fibers, short nylon fibers, short vinylon fibers, short polyester fibers, and cotton fibers. The short fibers 15 are manufactured, for example, in the following manner: long fibers subjected to an adhesion treatment of dipping them in an aqueous solution of resorcinol-formaldehyde latex (hereinafter referred to as an "RFL aqueous solution") and then heating them are cut across their lengths into pieces of predetermined length. The short fibers 15 have, for example, a length of 0.1-4.0 mm and a fiber diameter of 10-50 For example, 5-30 parts by mass of the short fibers 15 are blended into 100 parts by mass of the raw rubber.

The backing rubber layer 14 is formed, e.g., in the shape of a sheet with a thickness of 0.3-0.8 mm, and is integrally connected onto the surface of the adhesion rubber layer 12 located near the outer periphery of the belt, thereby forming the belt back face. When power is transmitted across the back face of the V-ribbed belt 10 wound around a flat pulley, the backing rubber layer 14 forms a contact part of the V-ribbed belt 10 with the flat pulley. The backing rubber layer 14 is made of a rubber composition (A) described below. The rubber composition (A) forming the backing rubber layer 14 is provided so that the grain direction corresponds to the belt lengthwise direction. Here, the grain direction denotes the direction in which an uncrosslinked rubber composition is calendered using a calender to form an uncrosslinked rubber sheet.

The rubber composition (A) is a rubber composition which contains an ethylene-α-olefin elastomer with an ethylene content of less than or equal to 60% by mass as raw rubber and which is obtained by blending various compounding ingredients into the raw rubber. Examples of the compounding ingredients blended into the raw rubber of the rubber composition (A) include a crosslinker, a crosslinking accelerator, a crosslinking supplement accelerator, a plasticizer, process oil, an antioxidant, a reinforcer, and a filler.

Examples of an ethylene-α-olefin elastomer with an ethylene content of less than or equal to 60% by mass include ethylene-propylene-diene monomer rubber (EPDM), such as JSR EP25 (with an ethylene content of 59% by mass) and JSR EP24 (with an ethylene content of 54% by mass) both made by JSR Corporation, Nordel IP3640 (with an ethylene content of 55% by mass) made by The Dow Chemical Company, Nordel IP4520 (with an ethylene content of 50% by mass) made by The Dow Chemical Company, and Esprene 501A (with an ethylene content of 52% by mass) made by Sumitomo Chemical Co., Ltd., and ethylene-propylene rubber (EPR), such as JSR EP11 (with an ethylene content of 52% by mass) made by JSR Corporation, Vistalon 785 (with an ethylene content of 49% by mass) made by Exxon Mobil Corporation, and Buna EP T4040 made by LANXESS K.K. The ethylene-α-olefin elastomer with an ethylene content of less than or equal to 60% by mass may be made of one elastomer, or may be made of multiple elastomers. When the ethylene-α-olefin elastomer is made of multiple types of rubber, the rubber composition (A) may contain a rubber material other than an ethylene-α-olefin elastomer with an ethylene content of less than or equal to 60% by mass.

Examples of the crosslinker include sulfur and organic peroxides. The crosslinker may be made of one crosslinker, or may be made of multiple crosslinkers.

Examples of the crosslinking accelerator include thiazole accelerators and thiuram accelerators. The crosslinking accelerator may be made of one crosslinking accelerator, or may be made of multiple crosslinking accelerators.

Examples of the crosslinking supplement accelerator include zinc oxide, magnesium oxide, and stearic acid. The crosslinking supplement accelerator may be made of one crosslinking supplement accelerator, or may be made of multiple crosslinking supplement accelerators.

Examples of the plasticizer include dialkyl phthalate, dialkyl adipate, and dialkyl sebacate. The plasticizer may be made of one plasticizer, or may be made of multiple plasticizers.

Examples of the process oil include paraffinic oil, naphthenic oil, and aromatic oil. The process oil may be made of one type of oil, or may be made of multiple types of oil.

Examples of the antioxidant include amine antioxidants and phenolic antioxidants. The antioxidant may be made of one antioxidant, or may be made of multiple antioxidants.

Examples of the reinforcer include carbon black GPF, carbon black FEF, and carbon black SRF. The reinforcer may be made of one reinforcer, or may be made of multiple reinforcers.

Examples of the filler include calcium carbonate, clay, talc, and diatomaceous earth. The filler may be made of one filler, or may be made of multiple fillers.

Short fibers are not blended into the rubber composition (A). This prevents rubber wear debris from being caught in the short fibers and thus accumulating on the contact surface of the belt with the flat pulley.

The rubber composition (A) has storage moduli, measured according to JIS K6394, of 20-60 MPa and 12 MPa or more at 25° C. and 100° C., respectively.

The backing rubber layer 14 is made of the rubber composition (A) having the above configuration, thereby providing excellent wear resistance and excellent adhesion resistance.

The adhesion rubber layer 12 and the compression rubber layer 13 may be made of different rubber compositions, or may be made of an identical rubber composition. The adhesion rubber layer 12 and the backing rubber layer 14 may be made of different rubber compositions, or may be made of an identical rubber composition.

The cord 16 is made of a twisted yarn 16' of fibers, such as polyethylene terephthalate (PET) fibers, polyethylene naphthalate (PEN) fibers, aramid fibers, or vinylon fibers. In order to give the cord 16 an adhesiveness to the V-ribbed belt body 11, the cord 16 is subjected, prior to molding, to an adhesion treatment of dipping the cord 16 in an RFL aqueous solution and then heating the cord 16 and/or an adhesion treatment of dipping the cord 16 in rubber cement and then drying the cord 16.

Figure 2:
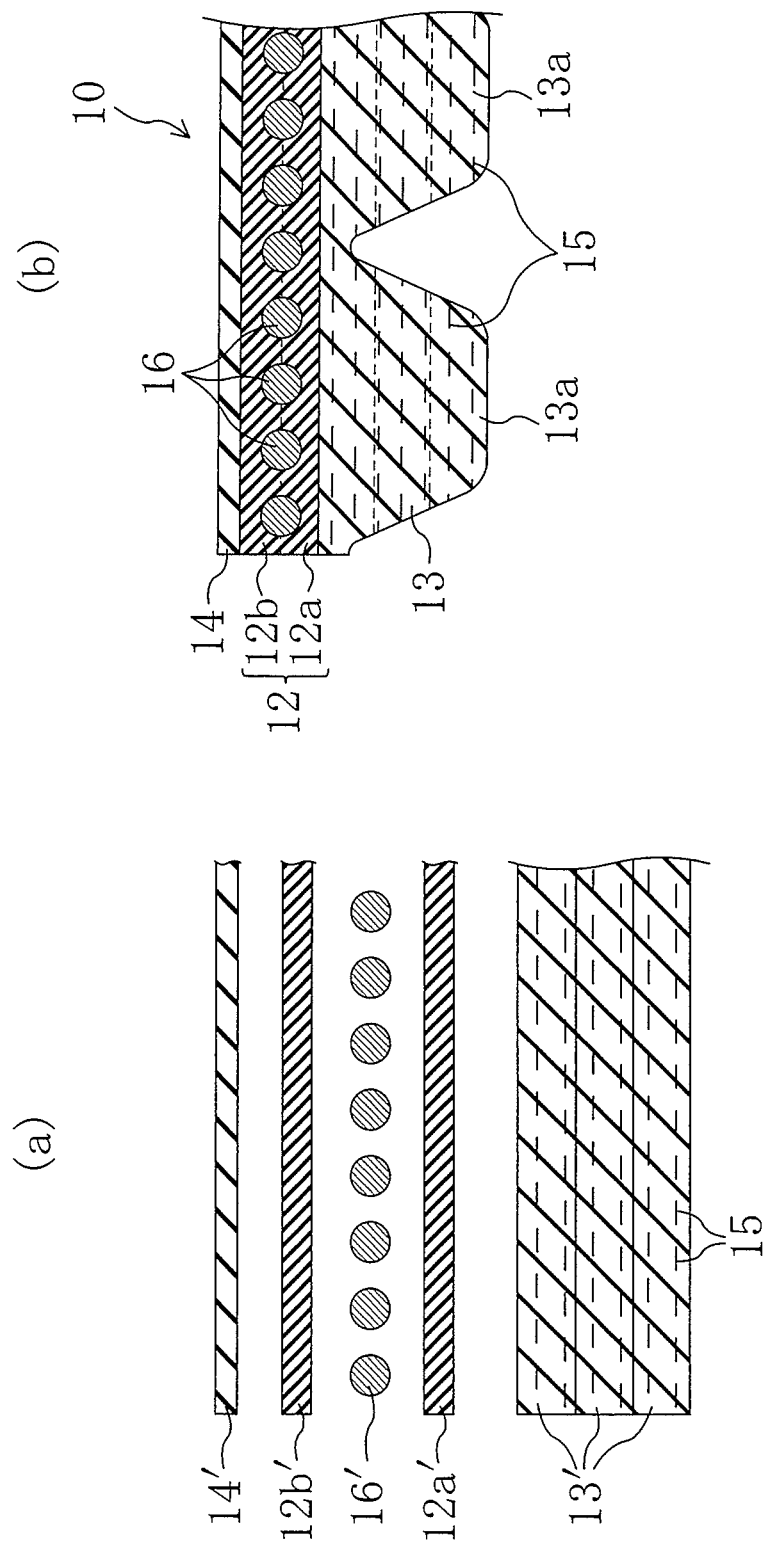
FIG. 2 is a diagram illustrating a method for fabricating a V-ribbed belt.

Next, a method for fabricating the V-ribbed belt 10 will be described with reference to FIG. 2.

In fabricating the V-ribbed belt 10, an inner mold having a molding outer surface for forming the belt back face into a predetermined shape and a rubber sleeve having a molding inner surface for forming the inner face of the belt into a predetermined shape are used.

First, an unvulcanized rubber sheet 14' for forming a backing rubber layer 14 is wound around the outer periphery of the inner mold. In this case, the unvulcanized rubber sheet 14' is wound so that the grain direction in which the unvulcanized rubber sheet 14' is calendered corresponds to the circumferential direction of the inner mold.

Subsequently, an unvulcanized rubber sheet 12b' for forming an outside part 12b of an adhesion rubber layer 12 is wound around the unvulcanized rubber sheet 14', a twisted yarn 16' forming a cord 16 is helically wound around the unvulcanized rubber sheet 12b', and an unvulcanized rubber sheet 12a' for forming an inside part 12a of the adhesion rubber layer 12 is then further wound around the cord-wound unvulcanized rubber sheet 12b'. Finally, an unvulcanized rubber sheet 13' for forming a compression rubber layer 13 is wound.

Thereafter, the rubber sleeve is fitted onto the molding article on the inner mold, and the rubber sleeve fitted onto the molding article is placed into a molding pan. Then, the inner mold is heated, e.g., by hot steam, and a high pressure is applied to the rubber sleeve to press the rubber sleeve radially inwardly. During this process, the raw rubber fluidizes, a crosslinking reaction proceeds, and furthermore, adhesion reactions of the twisted yarn 16' to the rubber also proceed. Thus, a cylindrical belt slab (belt body preform) is molded.

Then, the belt slab is removed from the inner mold and separated at different locations of its length into several pieces, and the outer periphery of each separated piece is then ground to form V-ribs 13a. In this case, the short fibers 15 exposed at the V-ribs 13a may protrude beyond the surfaces of the V-ribs 13a.

Finally, the separated belt slab piece having V-ribs 13a formed on the outer periphery is sliced into pieces of predetermined width, and each sliced piece is turned inside out to provide a V-ribbed belt 10.

Figure 3:
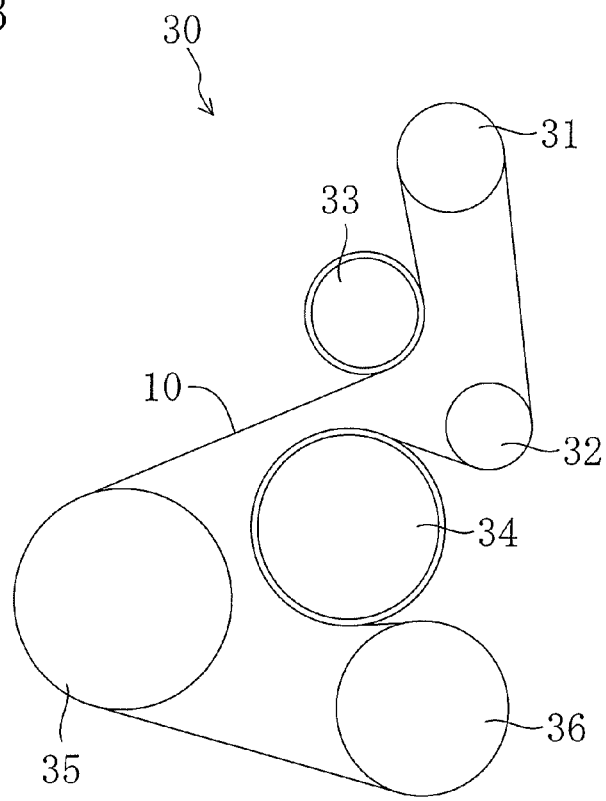
FIG. 3 is a layout of pulleys in an accessory drive belt transmission system.

FIG. 3 illustrates a layout of pulleys in an accessory drive belt transmission system 30 around which the V-ribbed belt 10 is used while being wound. This accessory drive belt transmission system 30 is a serpentine accessory drive belt transmission system having the V-ribbed belt 10 wound around six pulleys, i.e., four ribbed pulleys and two flat pulleys.

The accessory drive belt transmission system 30 includes an uppermost power steering pulley 31, an AC generator pulley 32 disposed below the power steering pulley 31, a flat tensioner pulley 33 disposed downward and leftward from the power steering pulley 31, a flat water pump pulley 34 disposed below the tensioner pulley 33, a crankshaft pulley 35 disposed downward and leftward from the tensioner pulley 33, and an air-conditioner pulley 36 disposed downward and rightward from the crankshaft pulley 35. Out of these pulleys, all the pulleys other than the tensioner pulley 33 and the water pump pulley 34, which are flat pulleys, are ribbed pulleys. The V-ribbed belt 10 is arranged by being wound around the power steering pulley 31 to allow the V-ribs 13a to come into contact with the power steering pulley 31, then wound around the flat tensioner pulley 33 to allow the backing rubber layer 14 forming a contact part of the belt with the flat pulleys to come into contact with the tensioner pulley 33, then sequentially wound around the crankshaft pulley 35 and the air-conditioner pulley 36 to allow the V-ribs 13a to come into contact with these pulleys, then wound around the flat water pump pulley 34 to allow the backing rubber layer 14 forming a contact part of the belt with the flat pulleys to come into contact with the water pump pulley 34, then wound around the AC generator pulley 32 to allow the V-ribs 13a to come into contact with the AC generator pulley 32, and then returned to the power steering pulley 31.

According to the V-ribbed belt 10 having the above configuration, the backing rubber layer 14 forming a contact part of the belt with the flat pulleys is made of the above-described rubber composition (A), and is placed so that the grain direction corresponds to the belt lengthwise direction, thereby providing excellent wear resistance and excellent adhesion resistance while maintaining cold resistance and heat resistance. Therefore, even when the belt is used while being wound around the tensioner pulley 33 and the water pump pulley 34 which are flat pulleys in the accessory drive belt transmission system 30, the belt wear debris deposited on the surfaces of the flat pulleys does not form a step, and thus, does not cause abnormal noise.

In the first embodiment, the V-ribbed belt 10 was described. However, the power transmission belt is not particularly limited to the V-ribbed belt, and may be any power transmission belt, such as a V belt, a synchronous belt, a toothed belt, a cogged belt, and a flat belt.

Second Embodiment

Figure 4:
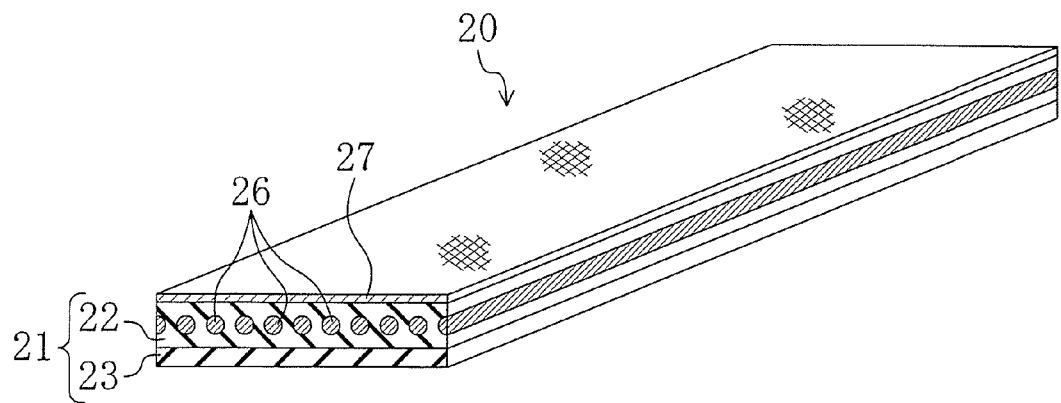
FIG. 4 is a perspective view of a flat belt.

FIG. 4 illustrates a flat belt 20 according to a second embodiment. The flat belt 20 is, e.g., for use in an air blower.

The flat belt 20 includes an endless flat belt body 21 configured such that a strip cord retaining layer 22 forming an outer part of the belt and a strip inside rubber layer 23 forming an inner part of the belt are laminated and integrated. The flat belt 20 is configured such that the cord retaining layer 22 has a cord 26 embedded in its central region in the thickness direction in a spiral with a certain pitch in the belt widthwise direction. Furthermore, the flat belt 20 includes a reinforcement fabric 27 covering the surface of the flat belt body 21 located near the outer periphery of the belt.

The cord retaining layer 22 is formed in the shape of a strip of long rectangular cross section, and has a thickness of 1.0-2.5 mm, for example. The cord retaining layer 22 is made of a rubber composition in which various compounding ingredients are blended into raw rubber. Examples of the raw rubber of the rubber composition forming the cord retaining layer 22 include an ethylene-α-olefin elastomer, such as ethylene-propylene rubber (EPR) and ethylene-propylene-diene monomer rubber (EPDM), chloroprene rubber (CR), chlorosulfonated polyethylene rubber (CSM), and hydrogenated acrylonitrile rubber (H-NBR). Out of them, an ethylene-α-olefin elastomer is preferable in terms of its environmental friendliness and performance, such as its wear resistance and crack resistance. Examples of the compounding ingredients include a crosslinker (e.g., sulfur, organic peroxides, etc.), an antioxidant, a processing aid, a plasticizer, a reinforcer, such as carbon black, and a filler. The cord retaining layer 22 is made of the rubber composition obtained by blending compounding ingredients into raw rubber, kneading them to form an unvulcanized rubber composition, and crosslinking the unvulcanized rubber composition using a crosslinker by application of heat and pressure.

The inside rubber layer 23 is made of a rubber composition containing an ethylene-α-olefin elastomer as raw rubber, and is formed, e.g., in the shape of a sheet with a thickness of 0.3-0.8 mm. When the flat belt 20 is run while being wound around a flat pulley, the inside rubber layer 23 forms a contact part of the belt with the flat pulley.

The rubber composition forming the inside rubber layer 23 is identical with the rubber composition described as the rubber composition (A) forming the backing rubber layer 14 of the above-described V-ribbed belt 10 according to the first embodiment. The rubber composition forming the inside rubber layer 23 is placed so that the grain direction corresponds to the belt lengthwise direction.

The cord retaining layer 22 and the inside rubber layer 23 may be made of different rubber compositions, or may be made of an identical rubber composition.

The cord 26 is made of a twisted yarn 26' of fibers, such as polyethylene terephthalate (PET) fibers, polyethylene naphthalate (PEN) fibers, aramid fibers, or vinylon fibers. The cord 26 has, for example, an outside diameter of 0.4-0.8 mm and a pitch of 0.4-1.0 mm in the belt widthwise direction. In order to give the cord 26 an adhesiveness to the flat belt body 21, the cord 26 is subjected, prior to molding, to an adhesion treatment of dipping the twisted yarn 26' in an RFL aqueous solution and then heating the twisted yarn 26' and/or an adhesion treatment of dipping the twisted yarn 26' in rubber cement and then drying the twisted yarn 26'.

The reinforcement fabric 27 is composed of a woven fabric 27' made of yarns of, e.g., cotton fibers, polyamide fibers, polyester fibers, or aramid fibers, such as by plain weaving, twill weaving, or satin weaving. The reinforcement fabric 27 has, e.g., a thickness of 0.5-1.0 mm. In order to give the reinforcement fabric 27 an adhesiveness to the flat belt body 21, the reinforcement fabric 27 is subjected, prior to molding, to an adhesion treatment of dipping the woven fabric 27' in an RFL aqueous solution and then heating the woven fabric 27' and/or an adhesion treatment of coating rubber cement on the surface of the woven fabric 27' facing the flat belt body 21 and then drying the woven fabric 27'. The reinforcement fabric 27 may be composed of a knit fabric.

According to the flat belt 20 having the above configuration, the inside rubber layer forming a contact part of the belt with a flat pulley is made of the rubber composition (A), thereby providing excellent wear resistance and excellent adhesion resistance while maintaining cold resistance and heat resistance. This reduces abnormal noise during the run of the belt.

The flat belt 20 having the above configuration can be fabricated using a known fabrication method.

In the second embodiment, the reinforcement fabric 27 is provided on the belt outer surface. However, provision of the reinforcement fabric 27 is not restrictive. A strip outside rubber layer may be located where the reinforcement fabric is provided.

[Test Evaluation]

Test evaluations conducted on V-ribbed belts will be described.

(Belts for Test Evaluation)

A compression rubber composition for a compression rubber layer, an adhesion rubber composition for an adhesion rubber layer, and backing rubber compositions 1-10 for a backing rubber layer were prepared, and V-ribbed belts of first through fifth examples and first through fifth comparative examples were fabricated. The configurations of the above rubber compositions and V-ribbed belts are illustrated also in Tables 1-3 and 4-5. V-ribbed belts which are a commercial product A and a commercial product B were prepared as examples of products.

<Compression Rubber Composition>

An uncrosslinked rubber composition for forming a compression rubber layer was obtained by kneading 100 parts by mass of EPDM (Product Name: JSR EP24, made by JSR Corporation) used as raw rubber and compounding ingredients composed of 60 parts by mass of carbon black FEF (Product Name: Seast SO, made by Tokai Carbon Co., Ltd.), 10 parts by mass of a plasticizer (Product Name: SUNPAR 2280, made by Japan Sun Oil Company, Ltd.), 1 part by mass of stearic acid (Product Name: STEARIC ACID 50S, made by New Japan Chemical Co., Ltd.), 5 parts by mass of zinc oxide (Product Name: Aenka #3, made by Sakai Chemical Industry Co., Ltd.), 1.5 parts by mass of sulfur (Product Name: OIL SULFUR, made by Hosoi Chemical Industry Co., Ltd.), 0.5 parts by mass of an antioxidant (1) (Product Name: NOCCELER M, made by OUCHI SHINKO CHEMICAL INDUSTRIAL CO., LTD.), 2.5 parts by mass of an antioxidant (2) (Product Name: NOCCELER TS, made by OUCHI SHINKO CHEMICAL INDUSTRIAL CO., LTD.), and 20 parts by mass of short nylon fiber (Product Name: Nylon 66, Type: T-5, Fiber Length: 1 mm, made by Asahi Kasei Corporation) for five minutes using an enclosed kneader.

<Adhesion Rubber Composition>

An uncrosslinked rubber composition for forming an adhesion rubber layer was obtained by kneading 100 parts by mass of EPDM (Product Name: JSR EP33, made by JSR Corporation) used as raw rubber and compounding ingredients composed of 85 parts by mass of the carbon black FEF, 15 parts by mass of the plasticizer, 1 part by mass of stearic acid, 5 parts by mass of zinc oxide, 1.5 parts by mass of sulfur, 0.5 parts by mass of the antioxidant (1), and 2.5 parts by mass of the antioxidant (2) for five minutes using an enclosed kneader.

<Backing Rubber Composition 1>

As a backing rubber composition 1, an uncrosslinked rubber composition was obtained by kneading 100 parts by mass of EPDM (1) (Product Name: JSR EP25, Ethylene Content: 59% by mass, made by JSR Corporation) used as raw rubber and compounding ingredients composed of 80 parts by mass of the carbon black FEF, 8 parts by mass of the plasticizer, 1 part by mass of stearic acid, 5 parts by mass of zinc oxide, 1.5 parts by mass of sulfur, 0.5 parts by mass of the antioxidant (1), and 2.5 parts by mass of the antioxidant (2) for five minutes using an enclosed kneader.

The storage modulus of the uncrosslinked rubber composition was measured according to JIS K6394 by using a dynamic mechanical analyzer (DMA) (RSA-III, made by TA Instruments Japan K.K.). In this case, the measurement conditions were such that the tensile direction in a tensile mode corresponded to the grain direction in which the rubber composition was calendered, the frequency was 10 Hz, the dynamic strain was 1%, the static load was 200 g, the distance between chucks was 20 mm, the sample width was 5 mm, and the sample thickness was 0.5 mm. The storage moduli E' of the backing rubber composition 1 at 25° C. and 100° C. were 30 MPa and 24 MPa, respectively.

<Backing Rubber Composition 2>

As a backing rubber composition 2, an uncrosslinked rubber composition was prepared with the same configuration as the backing rubber composition 1 except that the amount of carbon black blended was 70 parts by mass.

The storage modulus E' of the uncrosslinked rubber composition was measured in a method similar to the method for measuring the backing rubber composition 1. The storage moduli E' of the backing rubber composition 2 at 25° C. and 100° C. were 20 MPa and 23 MPa, respectively.

<Backing Rubber Composition 3>

As a backing rubber composition 3, an uncrosslinked rubber composition was prepared with the same configuration as the backing rubber composition 1 except that EPDM (2) (Product Name: JSR EP24, Ethylene Content: 54% by mass, made by JSR Corporation) was used as raw rubber.

The storage modulus E' of the uncrosslinked rubber composition was measured in a method similar to the method for measuring the backing rubber composition 1. The storage moduli E' of the backing rubber composition 3 at 25° C. and 100° C. were 23 MPa and 16 MPa, respectively.

<Backing Rubber Composition 4>

As a backing rubber composition 4, an uncrosslinked rubber composition was prepared with the same configuration as the backing rubber composition 3 except that the amount of the carbon black FEF blended was 85 parts by mass, and the amount of the plasticizer blended was 4 parts by mass.

The storage modulus E' of the uncrosslinked rubber composition was measured in a method similar to the method for measuring the backing rubber composition 1. The storage moduli E' of the backing rubber composition 4 at 25° C. and 100° C. were 50 MPa and 35 MPa, respectively.

<Backing Rubber Composition 5>

As a backing rubber composition 5, an uncrosslinked rubber composition was prepared with the same configuration as the backing rubber composition 4 except that the plasticizer was not blended.

The storage modulus E' of the uncrosslinked rubber composition was measured in a method similar to the method for measuring the backing rubber composition 1. The storage moduli E' of the backing rubber composition 5 at 25° C. and 100° C. were 60 MPa and 40 MPa, respectively.

<Backing Rubber Composition 6>

As a backing rubber composition 6, an uncrosslinked rubber composition was prepared with the same configuration as the backing rubber composition 1 except that EPDM (3) (Product Name: JSR EP21, Ethylene Content: 61% by mass, made by JSR Corporation) was used as raw rubber, and the amount of the carbon black FEF blended was 60 parts by mass.

The storage modulus E' of the uncrosslinked rubber composition was measured in a method similar to the method for measuring the backing rubber composition 1. The storage moduli E' of the backing rubber composition 6 at 25° C. and 100° C. were 21 MPa and 10 MPa, respectively.

<Backing Rubber Composition 7>

As a backing rubber composition 7, an uncrosslinked rubber composition was prepared with the same configuration as the backing rubber composition 1 except that the amount of the carbon black FEF blended was 80 parts by mass.

The storage modulus E' of the uncrosslinked rubber composition was measured in a method similar to the method for measuring the backing rubber composition 1. The storage moduli E' of the backing rubber composition 7 at 25° C. and 100° C. were 45 MPa and 22 MPa, respectively.

<Backing Rubber Composition 8>

As a backing rubber composition 8, an uncrosslinked rubber composition was prepared with the same configuration as the backing rubber composition 3 except that the amount of the carbon black FEF blended was 75 parts by mass.

The storage modulus E' of the uncrosslinked rubber composition was measured in a method similar to the method for measuring the backing rubber composition 1. The storage moduli E' of the backing rubber composition 8 at 25° C. and 100° C. were 18 MPa and 12 MPa, respectively.

<Backing Rubber Composition 9>

As a backing rubber composition 9, an uncrosslinked rubber composition was prepared with the same configuration as the backing rubber composition 2 except that 10 parts by mass of short nylon fiber were further blended.

The storage modulus E' of the uncrosslinked rubber composition was measured in a method similar to the method for measuring the backing rubber composition 1. The storage moduli E' of the backing rubber composition 9 at 25° C. and 100° C. were 35 MPa and 24 MPa, respectively.

<Backing Rubber Composition 10>

As a backing rubber composition 10, an uncrosslinked rubber composition was prepared with the same configuration as the backing rubber composition 4 except that the amount of the carbon black FEF blended was 85 parts by mass.

The storage modulus E' of the uncrosslinked rubber composition was measured in a method similar to the method for measuring the backing rubber composition 1. The storage moduli E' of the backing rubber composition 10 at 25° C. and 100° C. were 51 MPa and 35 MPa, respectively.

TABLE 1

|  | COMPRESSION RUBBER | ADHESION RUBBER |
| --- | --- | --- |
| EPDM (JSR EP24) | 100 |  |
| EPDM (JSR EP33) |  | 100 |
| CARBON BLACK FEF | 60 | 85 |
| OIL | 10 | 15 |
| STEARIC ACID | 1 | 1 |
| ZINC OXIDE | 5 | 5 |
| SULFUR | 1.5 | 1.5 |
| ANTIOXIDANT (1) | 0.5 | 0.5 |
| ANTIOXIDANT (2) | 2.5 | 2.5 |
| SHORT NYLON FIBER | 20 |  |

TABLE 2

|  | BACKING RUBBER COMPOSITION | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| EPDM (1) | 100 | 100 |  |  |  |  |  |  | 100 | 100 |
| ETHYLENE CONTENT | 59 | 59 |  |  |  |  |  |  | 59 | 59 |
| EPDM (2) |  |  | 100 | 100 | 100 |  | 100 |  |  |  |
| ETHYLENE CONTENT |  |  | 54 | 54 | 54 |  | 54 |  |  |  |
| EPDM (3) |  |  |  |  |  | 100 | 100 |  |  |  |
| ETHYLENE CONTENT |  |  |  |  |  | 61 | 61 |  |  |  |
| CARBON BLACK FEF | 80 | 70 | 80 | 85 | 85 | 60 | 80 | 75 | 70 | 85 |
| OIL | 8 | 8 | 8 | 4 | 0 | 8 | 8 | 8 | 8 | 8 |
| STEARIC ACID | 1 | 1 | 1 | 1 | 1 | 1 | 1 | 1 | 1 | 1 |
| ZINC OXIDE | 5 | 5 | 5 | 5 | 5 | 5 | 5 | 5 | 5 | 5 |
| SULFUR | 1.5 | 1.5 | 1.5 | 1.5 | 1.5 | 1.5 | 1.5 | 1.5 | 1.5 | 1.5 |
| ANTIOXIDANT (1) | 0.5 | 0.5 | 0.5 | 0.5 | 0.5 | 0.5 | 0.5 | 0.5 | 0.5 | 0.5 |
| ANTIOXIDANT (2) | 2.5 | 2.5 | 2.5 | 2.5 | 2.5 | 2.5 | 2.5 | 2.5 | 2.5 | 2.5 |
| SHORT NYLON FIBER |  |  |  |  |  |  |  |  | 10 | 10 |
| STORAGE MODULUS E' (MPa) (25° C.) | 30 | 20 | 23 | 50 | 60 | 21 | 45 | 18 | 35 | 51 |
| STORAGE MODULUS E' (MPa) (100° C.) | 24 | 23 | 16 | 35 | 40 | 10 | 22 | 12 | 24 | 35 |

TABLE 3

|  | MANUFACTURER | PRODUCT NAME | |
| --- | --- | --- | --- |
| EPDM (1) | JSR Corporation | JSR EP25 | ETHYLENE CONTENT: 59% BY MASS |
| EPDM (2) | JSR Corporation | JSR EP24 | ETHYLENE CONTENT: 54% BY MASS |
| EPDM (3) | JSR Corporation | JSR EP21 | ETHYLENE CONTENT: 61% BY MASS |
| CARBON BLACK FEF | Tokai Carbon Co., Ltd. | Seast SO | — |
| PLASTICIZER | Japan Sun Oil Company, Ltd. | SUNPAR 2280 | — |
| STEARIC ACID | New Japan Chemical Co., Ltd. | STEARIC ACID 50S | — |
| ZINC OXIDE | Sakai Chemical Industry Co., Ltd. | Aenka #3 | — |
| SULFUR | Hosoi Chemical Industry Co., Ltd. | OIL SULFUR | — |
| ANTIOXIDANT (1) | OUCHI SHINKO CHEMICAL INDUSTRIAL CO., LTD. | NOCCELER M | — |
| ANTIOXIDANT (2) | OUCHI SHINKO CHEMICAL INDUSTRIAL CO., LTD. | NOCCELER TS | — |
| SHORT NYLON FIBER | Asahi Kasei Corporation | Nylon 66, Type: T-5 | FIBER LENGTH: 1 mm |

First Example

The adhesion rubber composition, the compression rubber composition, and the backing rubber composition 1 were processed into sheets. As a first example, a V-ribbed belt was fabricated by forming an adhesion rubber layer, a compression rubber layer, and a backing rubber layer using the corresponding uncrosslinked rubber sheets.

The width of the V-ribbed belt was 10.68 mm, the thickness thereof was 4.8 mm, the pitch between each adjacent pair of ribs thereof was 3.56 mm, and the number of the ribs was three. The grain direction of the backing rubber layer was oriented in the belt lengthwise direction.

Second Example

As a second example, a V-ribbed belt was fabricated with the same configuration as the first example except that the backing rubber composition 2 was used as a rubber composition forming a backing rubber layer.

Third Example

As a third example, a V-ribbed belt was fabricated with the same configuration as the first example except that the backing rubber composition 3 was used as a rubber composition forming a backing rubber layer.

Fourth Example

As a fourth example, a V-ribbed belt was fabricated with the same configuration as the first example except that the backing rubber composition 4 was used as a rubber composition forming a backing rubber layer.

Fifth Example

As a fifth example, a V-ribbed belt was fabricated with the same configuration as the first example except that the backing rubber composition 5 was used as a rubber composition forming a backing rubber layer.

First Comparative Example

As a first comparative example, a V-ribbed belt was fabricated with the same configuration as the first example except that the backing rubber composition 6 was used as a rubber composition forming a backing rubber layer.

Second Comparative Example

As a second comparative example, a V-ribbed belt was fabricated with the same configuration as the first example except that the backing rubber composition 7 was used as a rubber composition forming a backing rubber layer.

Third Comparative Example

As a third comparative example, a V-ribbed belt was fabricated with the same configuration as the first example except that the backing rubber composition 8 was used as a rubber composition forming a backing rubber layer.

Fourth Comparative Example

As a fourth comparative example, a V-ribbed belt was fabricated with the same configuration as the first example except that the backing rubber composition 9 was used as a rubber composition forming a backing rubber layer, and that the grain direction of the backing rubber layer was oriented in the belt widthwise direction.

Fifth Comparative Example

As a fifth comparative example, a V-ribbed belt was fabricated with the same configuration as the fourth comparative example except that the backing rubber composition 10 was used as a rubber composition forming a backing rubber layer.

<Commercial Product A>

As a commercial product A, a V-ribbed belt was prepared. The width of the V-ribbed belt was 10.68 mm, the thickness thereof was 4.3 mm, the pitch between each adjacent pair of ribs thereof was 3.56 mm, and the number of the ribs was three. A backing rubber layer of the commercial product A was made of an EPDM rubber composition.

<Commercial Product B>

As a commercial product B, a V-ribbed belt was prepared. The width of the V-ribbed belt was 10.68 mm, the thickness thereof was 4.0 mm, the pitch between each adjacent pair of ribs thereof was 3.56 mm, and the number of the ribs was three. A backing rubber layer of the commercial product B was made of the backing rubber composition 9.

(Test Evaluation Method)

<Test Evaluation 1>

Figure 5:
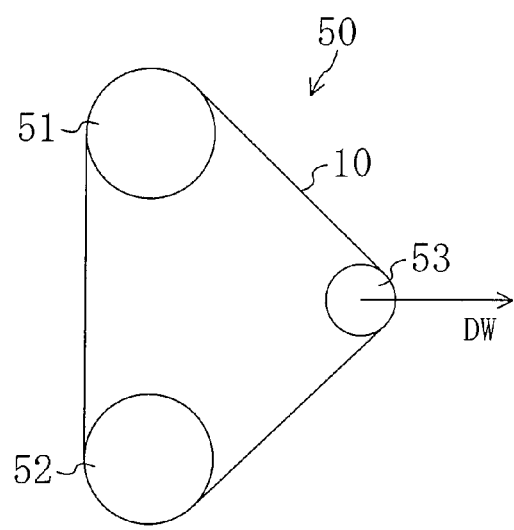
FIG. 5 is a layout of pulleys in a belt running tester used in Test Evaluation 1.

FIG. 5 illustrates a layout of pulleys of a belt running tester 50 for use in Test Evaluation 1.

The belt running tester 50 includes ribbed pulleys 51 and 52 disposed one above the other and having a diameter of 120 mm, and a tension pulley 53 disposed vertically midway between the ribbed pulleys 51 and 52 and to the right of these pulleys. The upper ribbed pulley is a driven pulley, and the lower ribbed pulley is a driving pulley. The ribbed pulleys 51 and 52 are placed to each have a total arc of contact of 90° with the belt.

The masses of the V-ribbed belts of the first through fifth examples and the first through fifth comparative examples were measured, and then each of the V-ribbed belts was wound around the belt running tester 50. In this state, the tension pulley 53 was pulled sideways such that a dead weight of 686 N was imposed on the tension pulley 53, and the ribbed pulley 52 was rotated counterclockwise at 4900 rpm under an ambient temperature of 25° C. Then, the V-ribbed belt was run over five million laps, and then the belt mass was again measured. The amount of wear of the V-ribbed belt per square meter of surface area was determined using the difference between the belt mass before the run of the belt and that after the run of the belt as the amount of the belt worn away.

The states of abnormal noise generated during the run of the belt were categorized as follows. The level at which abnormal noise is inaudible even with the use of a stethoscope was categorized as "none," the level at which while nothing is audible without using a stethoscope, a faint abnormal noise is audible with the use of a stethoscope was categorized as "low," the level at which an abnormal noise is audible even without using a stethoscope was categorized as "medium," the level at which an abnormal noise is clearly audible was categorized as "high," and the level at which an abnormal noise is large and thus uncomfortable was categorized as "extra-high."

Figure 6:
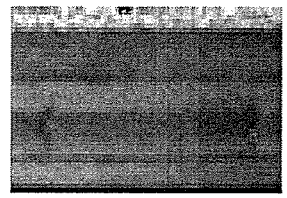
FIGS. 6(a)-6(d) are pictures illustrating a state of adhesion to the belt surface at every adhesion level.
Figure 6:
Figure 6:
Figure 6:

Furthermore, the states of adhesion to the belt surface after the run of the belt were visually observed and categorized as follows. FIG. 6 is pictures illustrating the state of adhesion to the belt surface at each adhesion level. The state in which no deposit was seen on the belt surface was categorized as "ADHESION LEVEL 1," the state in which an elongated deposit was seen on the belt surface was categorized as "ADHESION LEVEL 2," the state in which a wide and thick deposit was deposited on the belt surface was categorized as "ADHESION LEVEL 3," and the state in which a deposit on the belt surface was extensively deposited to the extent that the deposit extended across the belt width was categorized as "ADHESION LEVEL 4."

<Test Evaluation 2>

Figure 7:
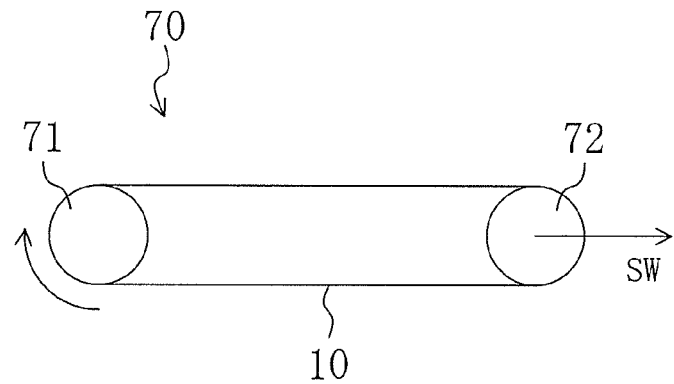
FIG. 7 is a layout of pulleys in a belt running tester used in Test Evaluation 2.

FIG. 7 illustrates a layout of pulleys of a belt running tester 70 for use in Test Evaluation 2.

The belt running tester 70 includes a driving ribbed pulley 71 having a diameter of 45 mm, and a driven ribbed pulley 72 disposed to the right of the driving ribbed pulley 71 and having a diameter of 45 mm.

Each of the V-ribbed belts of the first through fifth examples and the first through fifth comparative examples was wound around the belt running tester 70. In this state, the driven ribbed pulley 72 was pulled sideways such that a set weight of 98 N per rib (a total set weight of 294 N) was imposed on the driven ribbed pulley 72, and the belt was run so that a one-second belt running and a nine-second stop of the belt running were alternately repeated under an ambient temperature of −40° C. During the run of the belt, the driving ribbed pulley 71 was rotated counterclockwise at 1800 rpm. A total of 10 seconds including the one-second running and the nine-second stop was used as one cycle, the cycle was then repeated until a crack was formed in the V-ribbed belt, and the number of cycles until the formation of the crack was used as the life at low temperatures. Then, the belt running test was terminated after 1,200 cycles were performed since the start of the belt running.

<Test Evaluation 3>

Figure 8:
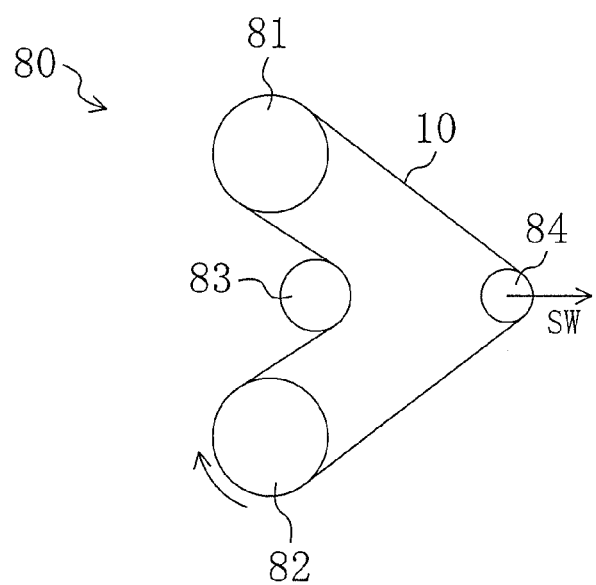
FIG. 8 is a layout of pulleys in a belt running tester used in Test Evaluation 3.

FIG. 8 illustrates a layout of pulleys of a belt running tester 80 for use in Test Evaluation 3.

The belt running tester 80 includes ribbed pulleys 81 and 82 disposed one above the other and having a diameter of 120 mm, a flat idler pulley 83 disposed vertically midway between the ribbed pulleys 81 and 82 (and having a diameter of 85 mm), and a ribbed pulley 84 disposed to the right of the idler pulley 83 and having a diameter of 45 mm. The upper one of the ribbed pulleys 81 and 82 is a driven pulley, and the lower one thereof is a driving pulley. The idler pulley 83 and the ribbed pulley 84 are placed to each have a total arc of contact of 90° with the belt.

Each of the V-ribbed belts of the first through fifth examples and the first through fifth comparative examples was wound around the belt running tester 80. In this state, the ribbed pulley 84 was pulled sideways such that a set weight of 559 N was imposed on the ribbed pulley 84, and the ribbed pulley 82 was rotated counterclockwise at 4900 rpm under an ambient temperature of 120° C. The belt kept being run until a crack is formed in the V-ribbed belt, and the belt running time until the formation of the crack was used as the life at high temperatures. When 500 hours had elapsed since the start of the belt running, the belt running test was terminated.

<Test Evaluation 4>

Figure 9:
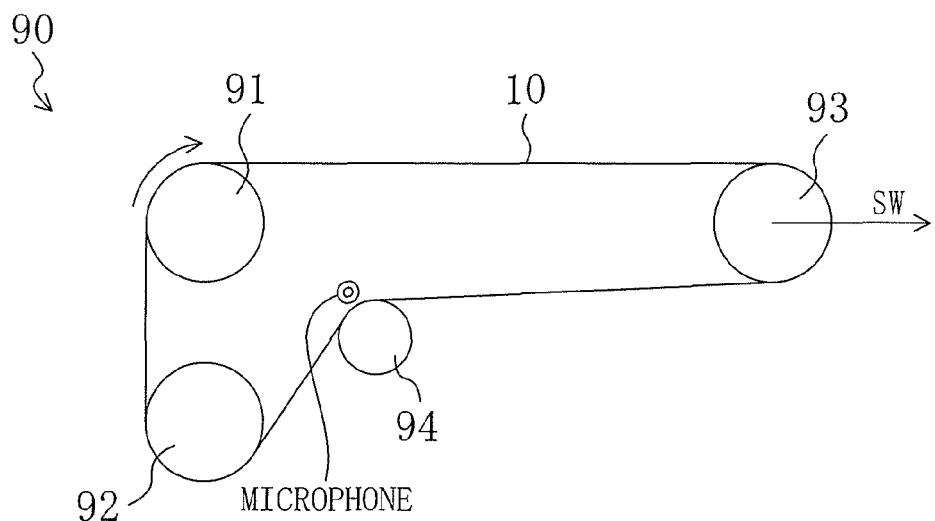
FIG. 9 is a layout of pulleys in a belt running tester used in Test Evaluation 4.

FIG. 9 illustrates a layout of pulleys of a belt running tester 90 for use in Test Evaluation 4.

The belt running tester 90 includes a driving ribbed pulley 91 and a first driven ribbed pulley 92 which are disposed one above the other (and each have a diameter of 120 mm), a second driven ribbed pulley 93 disposed to the right of the driving ribbed pulley 91 (and having a diameter of 120 mm), and a flat idler pulley 94 disposed to the right of the vertical midpoint between the driving ribbed pulley 91 and the first driven ribbed pulley 92 (and having a diameter of 60 mm). A microphone is placed upward and leftward from the idler pulley 94 and approximately 10 mm away inward from the surface of the idler pulley 94 around which a belt is wound. The microphone is connected to a noise meter.

Each of the commercial products A and B and the V-ribbed belt of the fourth example was installed on the belt running tester 90 such that the V-ribbed belt was wound around the first driven ribbed pulley 92, the driving ribbed pulley 91, and the second driven ribbed pulley 93 sequentially to allow the ribs of the V-ribbed belt to be in contact with the pulleys; the V-ribbed belt was then wound around the idler pulley 94 to allow the back face of the V-ribbed belt to be in contact with the pulley 94; and finally the belt was returned to the first driven ribbed pulley 93. In this state, a set weight of 196 N was laterally imposed on the second driven ribbed pulley 93, and the second driven ribbed pulley 93 was rotated clockwise at a rotation speed of 2000 rpm under an ambient temperature of 20±5° C.

The states of abnormal noise caused by each of the belts were measured using the noise meter connected to the microphone in 24 hours and in 96 hours after the start of the belt running. The conditions of the back face of each of the V-ribbed belts in 24 hours and in 96 hours were observed, and thus, the adhesion level was estimated.

(Test Evaluation Results)

Figure 10:
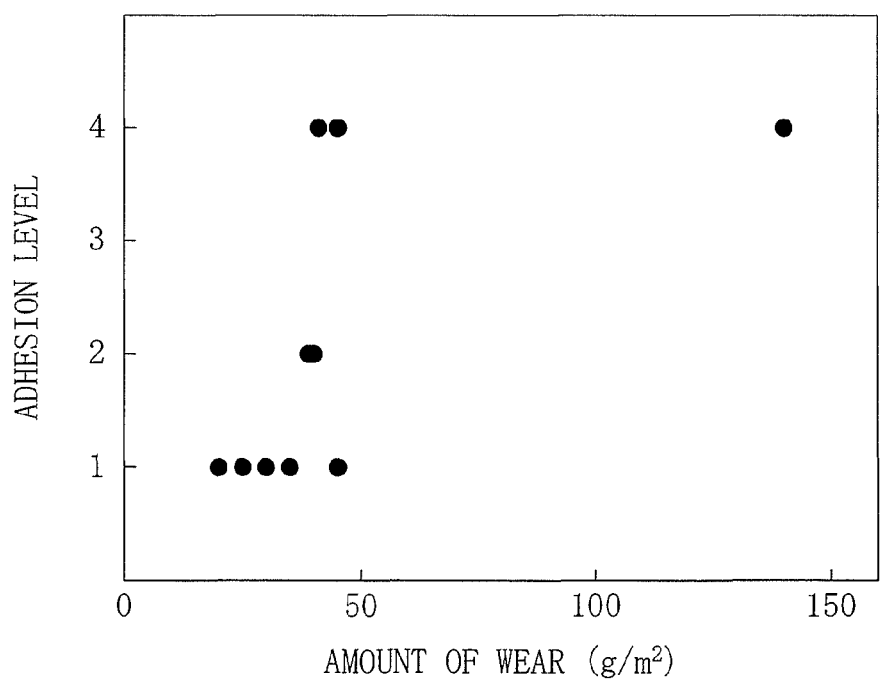
FIG. 10 is a graph illustrating the relationship between the amount of wear and the adhesion level in Test Evaluation 1.
Figure 11:
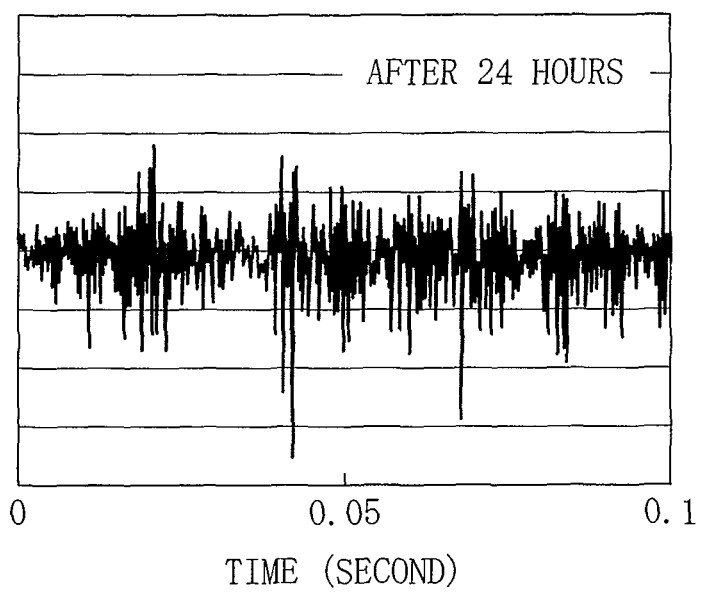
FIG. 11(a) is a graph illustrating the state of abnormal noise of a V-ribbed belt which is a commercial product A in 24 hours after the start of the run.
FIG. 11(b) is a graph illustrating the same in 96 hours after the start of the run.
Figure 11:
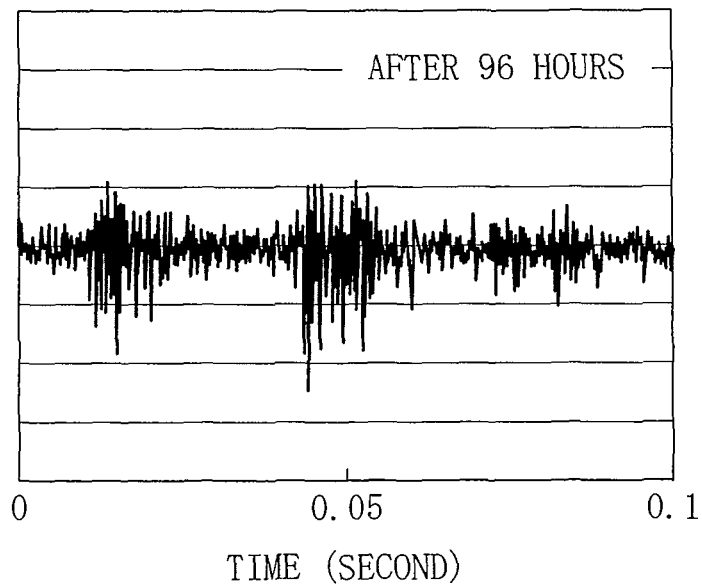
Figure 12:
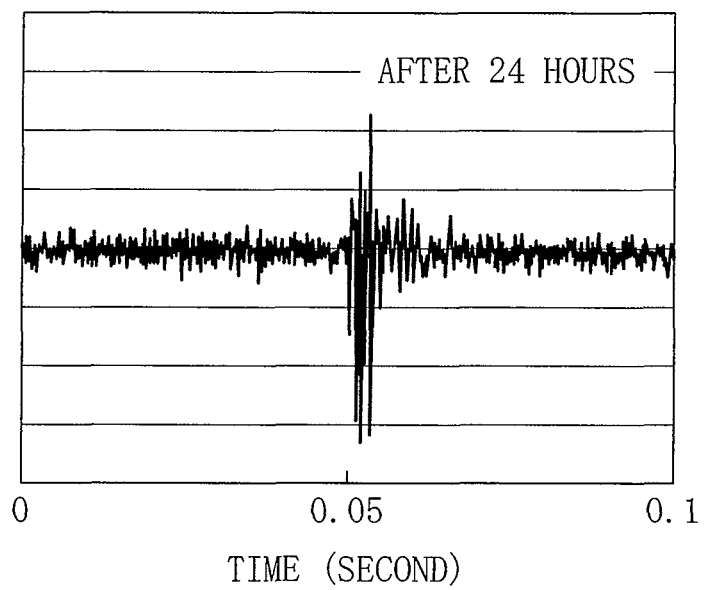
FIG. 12(a) is a graph illustrating the state of abnormal noise of a V-ribbed belt which is a commercial product B in 24 hours after the start of the run.
Figure 12:
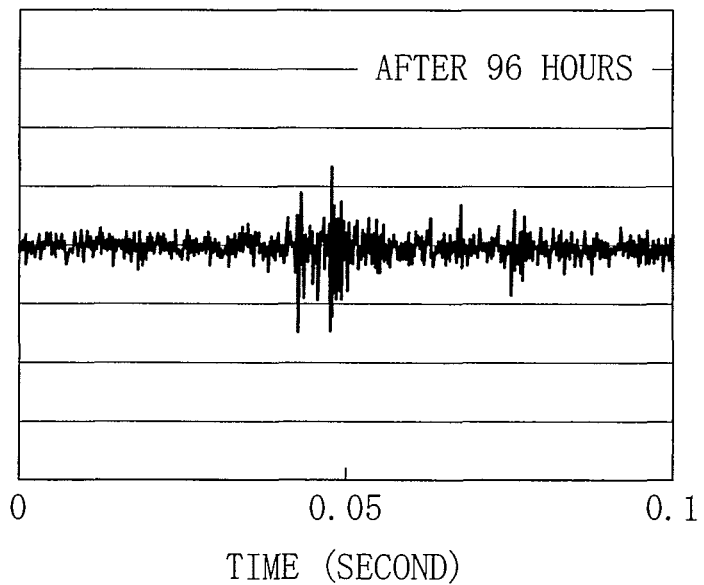
Figure 13:
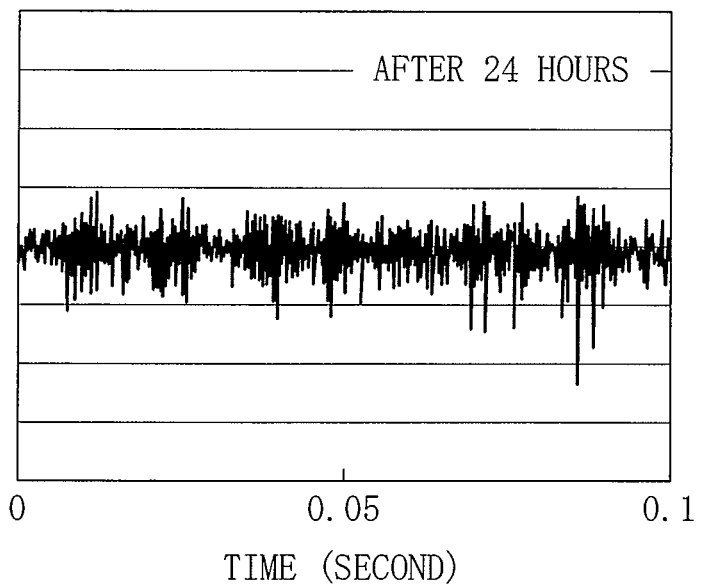
FIG. 13(a) is a graph illustrating the state of abnormal noise of a V-ribbed belt of a fourth example in 24 hours after the start of the run.
FIG. 13(b) is a graph illustrating the same in 96 hours after the start of the run.
Figure 13:
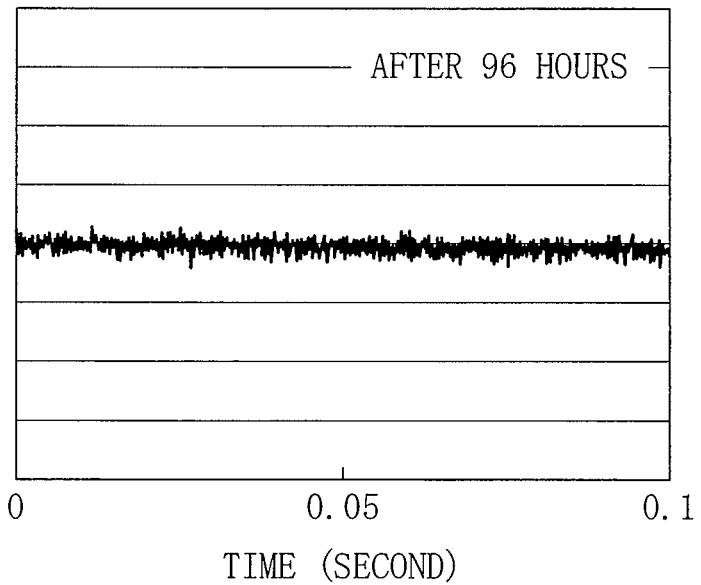

Tables 4 and 5 illustrate the results of Test Evaluations 1-3. FIG. 10 is a graph illustrating the relationship between the amount of wear and the adhesion level out of these results. FIGS. 11-13 and Table 6 illustrate the results of Test Evaluation 4.

TABLE 4

|  | FIRST EXAMPLE | SECOND EXAMPLE | THIRD EXAMPLE | FOURTH EXAMPLE | FIFTH EXAMPLE |
| --- | --- | --- | --- | --- | --- |
| BACKING RUBBER COMPOSITION | 1 | 2 | 3 | 4 | 5 |
| GRAIN DIRECTION | LENGTHWISE DIRECTION | LENGTHWISE DIRECTION | LENGTHWISE DIRECTION | LENGTHWISE DIRECTION | LENGTHWISE DIRECTION |
| AMOUNT OF WEAR ($g/m^2$) | 20 | 40 | 39 | 30 | 25 |
| ADHESION LEVEL | 1 | 2 | 2 | 1 | 1 |
| NOISE LEVEL | NONE | NONE | NONE | NONE | NONE |
| LIFE AT LOW TEMPERATURES (CYCLE NUMBER) | 1200 OR MORE | 1200 OR MORE | 1200 OR MORE | 1000 | 800 |
| LIFE AT HIGH TEMPERATURES (h) | 500 OR MORE | 500 OR MORE | 500 OR MORE | 500 OR MORE | 500 OR MORE |

TABLE 5

|  | FIRST COMPARATIVE EXAMPLE | SECOND COMPARATIVE EXAMPLE | THIRD COMPARATIVE EXAMPLE | FOURTH COMPARATIVE EXAMPLE | FIFTH COMPARATIVE EXAMPLE |
|---|---|---|---|---|---|
| BACKING RUBBER COMPOSITION | 6 | 7 | 8 | 9 | 10 |
| GRAIN DIRECTION | LENGTHWISE DIRECTION | LENGTHWISE DIRECTION | LENGTHWISE DIRECTION | WIDTHWISE DIRECTION | WIDTHWISE DIRECTION |
| AMOUNT OF WEAR ($g/m^2$) | 45 | 45 | 41 | 140 | 35 |
| ADHESION LEVEL | 4 | 1 | 4 | 4 | 1 |
| NOISE LEVEL | HIGH STICKY SOUND | NONE — | HIGH STICKY SOUND | EXTRA-HIGH TAPPING SOUND | NONE — |
| LIFE AT LOW TEMPERATURES (CYCLE NUMBER) | 700 | 100 | 1200 OR MORE | 1200 OR MORE | 700 |
| LIFE AT HIGH TEMPERATURES (h) | 500 OR MORE | 500 OR MORE | 500 OR MORE | 500 OR MORE | 100 |

TABLE 6

|  |  | COMMERCIAL PRODUCT A | COMMERCIAL PRODUCT B | FOURTH EXAMPLE |
|---|---|---|---|---|
| BACKING RUBBER COMPOSITION | | EPDM RUBBER COMPOSITION | 9 | 4 |
| NOISE LEVEL (dBA) | AFTER 24 HOURS | 84.23 | 80.31 | 79.44 |
|  | AFTER 96 HOURS | 80.07 | 76.48 | 69.23 |
| ADHESION LEVEL | AFTER 24 HOURS | 4 | 4 | 2 |
|  | AFTER 96 HOURS | 2 | 3 | 1 |

Tables 4 and 5 shows that when a group of the first through fifth examples is compared with a group of the first and second comparative examples in each of which an ethylene-α-olefin elastomer with an ethylene content of greater than 60% by mass was used, the former group offers better cold resistance. Furthermore, it is seen that although in the first comparative example, abnormal noise, such as sticky sound, was caused, and the state of adhesion was also bad, the belt of the second comparative example in which the amount of the blended carbon black increased in order to address the above problems exhibited a further reduced cold resistance while solving the problems of the adhesion resistance and noise reduction.

Comparison between a group of the first through fifth examples in each of which the storage moduli at 25° C. and 100° C. were 20-60 MPa and 12 MPa or more, respectively, and the third comparative example in which the storage modulus at 25° C. was 18 MPa shows that the former group offers better wear resistance and better noise reduction.

Comparison between a group of the first through fifth examples in each of which the grain direction corresponded to the belt lengthwise direction, and short fibers were not contained, and the fourth comparative example in which the grain direction corresponded to the belt widthwise direction, and short fibers were blended shows that in the latter example, the amount of wear of the corresponding belt significantly increased, and abnormal noise, such as tapping sound, was caused. Comparison between the fourth comparative example and the fifth comparative example in which the amount of carbon black was increased in order to offer better wear resistance, better adhesion resistance, and better noise reduction than in the fourth comparative example shows that the fifth comparative example has a reduced cold resistance and a reduced heat resistance while solving the problems of wear resistance, adhesion resistance, and noise reduction.

Comparison between a group of the first through third examples and a group of the fourth and fifth examples in which the amount of carbon black is large shows that the former group offers better cold resistance.

FIG. 10 shows that when the amount of wear of a belt exceeds 40 $g/m^2$, the state of adhesion to the belt surface tends to be worse.

Table 6 and FIGS. 11-13 show that the V-ribbed belt of the fourth example in which the backing rubber layer is made of the backing rubber composition 4 is superior to the commercial products A and B in terms of noise and adhesion resistance in both 24 hours and 96 hours after the start of the belt running.

INDUSTRIAL APPLICABILITY

As described above, the present invention is useful for a power transmission belt used while being wound around a flat pulley.

DESCRIPTION OF REFERENCE CHARACTERS

10 V-Ribbed Belt (Power Transmission Belt)
11 V-Ribbed Belt Body
14 Backing Rubber Layer (Contact Part with Flat Pulley)
20 Flat Belt (Power Transmission Belt)
21 Flat Belt Body
23 Inside Rubber Layer (Contact Part with Flat Pulley)

The invention claimed is:
1. A power transmission belt comprising:
a belt body which is made of a solid nonfoam rubber composition including a backing layer having a flat contact face consisting of said solid nonfoam rubber composition for contact with a flat pulley and which is made of rubber composition containing an ethylene-α-olefin elastomer with an ethylene content of less than or equal to 60% by mass as raw rubber,
wherein the rubber composition forming the contact part with the flat pulley has a storage modulus of 20-60 MPa at 25° C. and a storage modulus of 12 MPa or more at 100° C., short fibers are not blended into the rubber composition, and the grain direction of the rubber composition corresponds to a belt lengthwise direction, wherein the flat contact face for contacting the flat pulley is a back face of the belt, and wherein the belt body further comprises a V-ribbed compression layer that includes a front face of the belt and which is made of a rubber composition that includes short fibers, and an adhesion rubber layer is provided between and is in direct contact with both the compression rubber layer and the backing layer, and a cord is embedded in and completely surrounded by the adhesion rubber layer along a thickness of the adhesion rubber layer.

2. The power transmission belt of claim 1, wherein the solid nonfoam rubber composition contains an ethylene-α-olefin elastomer with an ethylene content of less than 60% by mass as raw rubber.

* * * * *